R. MILECZ.
LATHE TOOL HOLDER.
APPLICATION FILED AUG. 8, 1916.
1,214,347.
Patented Jan. 30, 1917.
3 SHEETS—SHEET 1.
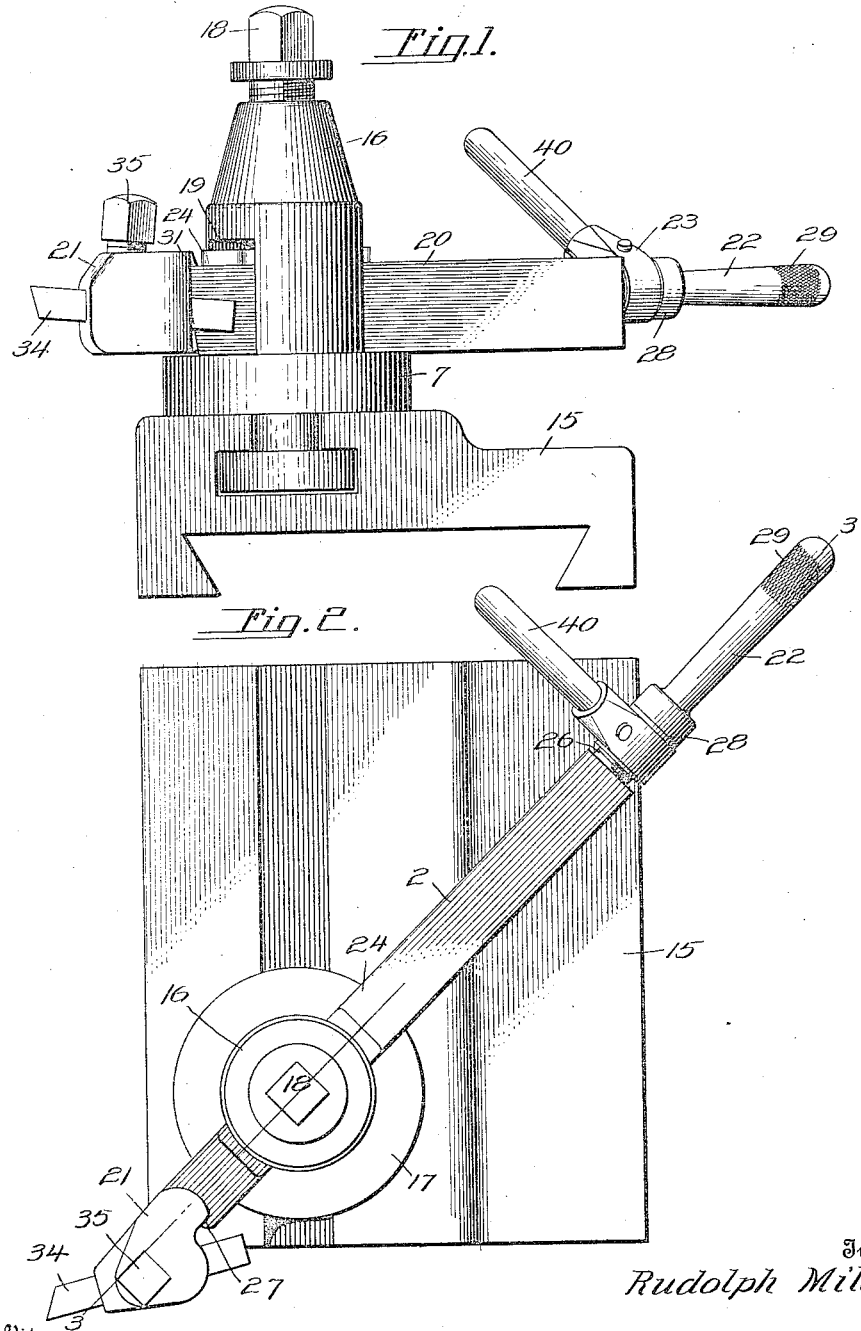
Witnesses
F. C. Gibson.
Wm Bagger.
Inventor
Rudolph Milecz.
By Victor J. Evans
Attorney

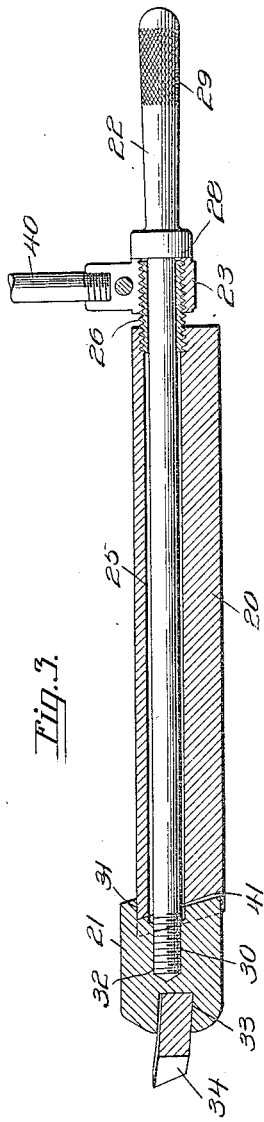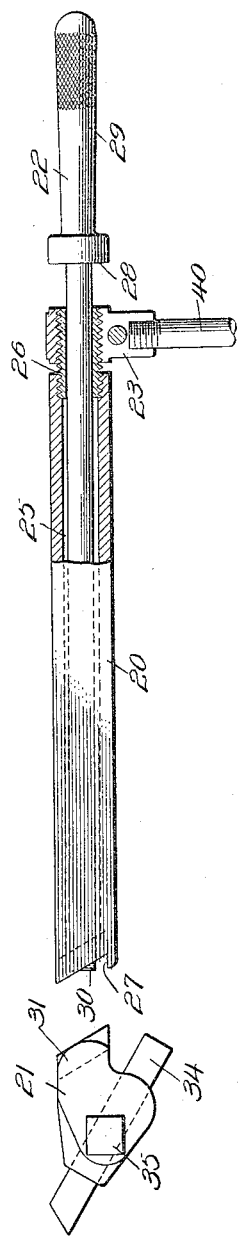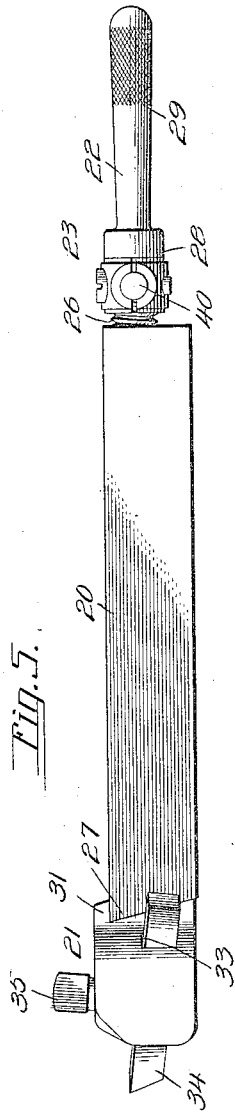

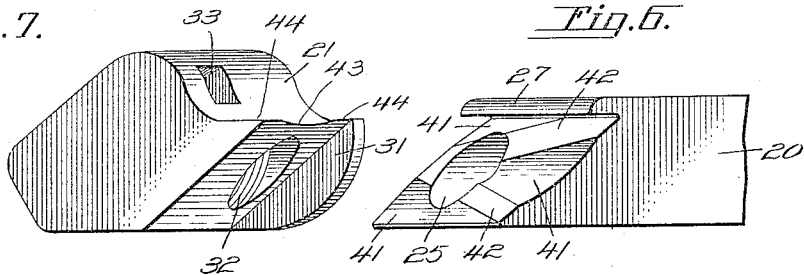

UNITED STATES PATENT OFFICE.

RUDOLPH MILECZ, OF HOBOKEN, NEW JERSEY.

LATHE TOOL-HOLDER.

1,214,347.  Specification of Letters Patent.  Patented Jan. 30, 1917.

Application filed August 8, 1916. Serial No. 113,793.

*To all whom it may concern:*

Be it known that I, RUDOLPH MILECZ, a citizen of the United States, residing at Hoboken, in the county of Hudson and State of New Jersey, have invented new and useful Improvements in Lathe Tool-Holders, of which the following is a specification.

This invention relates to tool holders for turning lathes, and it has for its object to produce a tool holder which will permit the tool to be removed and replaced without changing the set of the tool, thereby saving much time which is usually consumed in making necessary readjustments.

A further object of the invention is to provide a tool holder comprising a shank and a tool carrying head detachably connected therewith, the parts being so constructed as to enable the head to be removed and replaced without changing the set of the tool.

A further object of the invention is to simplify and improve the construction of the shank, the tool carrying head and the means utilized for assembling the same.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a view in side elevation showing the top slide of the slide rest of a turning lathe, the tool post, and the improved tool holder connected therewith. Fig. 2 is a top plan view of the same. Fig. 3 is a sectional view taken on the line 3—3 in Fig. 2. Fig. 4 is a top plan view, partly in section, showing the tool holder and tool carrying head separated. Fig. 5 is a side view of the same. Fig. 6 is a perspective detail view showing a portion of the shank of the tool holder. Fig. 7 is a perspective view showing the head of the tool holder. Figs. 8, 9, 10, 11, 12, 13 and 14 are detail views showing various tools and heads adapted to hold the same.

Corresponding parts in the several figures are denoted by like characters of reference.

The top slide 15 of an ordinary slide rest has been shown as being equipped with a tool post 16 of conventional construction, 17 being the tool post collar and 18 the clamping screw whereby the tool holder is usually clamped in the slot 19 of the tool post.

The tool holder in the present instance is composed of a shank 20, a detachable head 21, a screw threaded connecting member 22 and a tightening nut 23.

The shank 20 consists of a bar of rectangular cross section adapted to be received in the slot 19 of the tool post where it is secured by the clamping screw 18, a shim 24 being employed if desired. The shank 20, which may be of any desired length, has a longitudinal bore 25 at the rearward end of which is fixed an exteriorly threaded sleeve 26. The face at the forward end of the shank is obliquely disposed in a single plane with respect to the longitudinal axis of the shank, said face being arranged slantingly in two directions, namely, downwardly and laterally, a vertically disposed shoulder 27 being provided which forms an acute angle with respect to the latter slant of the face. The connecting member 22 which extends through the bore 25 consists of a spindle which is provided near its rearward end with a limiting shoulder 28 and with a handle 29, the forward end of the spindle being screw threaded, as seen at 30, and the parts being so proportioned that when the shoulder 28 abuts on the rearward end of the sleeve 26, the threaded portion 30 will protrude beyond the oblique face of the shank.

The head 21 of the tool holder has an obliquely disposed face mating the oblique face of the shank, being disposed in a single plane with respect to the longitudinal axis of said shank, the said head being provided with a shoulder 31 overhanging the obliquely disposed face with which it forms an acute angle. The head 21 is provided with a threaded socket 32 alining with the bore of the shank, and the said head is also provided with a transverse aperture 33 for the reception of the tool or bit 34 which is clamped in position by means of a set screw 35. Sometimes, as seen in Fig. 8, a revoluble tool 36 is provided, and it is obvious that the clamping screw 35, as well as the aperture 33, will then be dispensed with, the tool 36 being mounted on a spindle 37 within a suitable recess 38.

In Figs. 9 to 14, inclusive, have been shown heads adapted to be mounted interchangeably on a single shank, said heads being of similar construction with the exception that the tool receiving aperture is formed in the different heads at various angles with respect to the faces of the heads, according to the nature of the tools carried thereby, said tools or bits being adapted for various kinds of work, as will be readily understood by an inspection of Figs. 9 to 14, inclusive. It is obvious that other variations in the tools may necessitate corresponding variations in the heads, but such changes will be readily understood, the illustrations here given being merely suggestive.

In assembling the head with the shank of the tool holder the mating faces of the head and the shank are juxtaposed, the head being moved laterally on the obliquely disposed face of the shank until it becomes seated in the angle between the face of the shank and the shoulder 27, and the head being also moved vertically until the overhanging shoulder 31 engages the top edge of the shank. The threaded recess 32 will now have been brought in alinement with the bore of the shank so that when the connecting member is pushed into the bore, the threaded end thereof will readily enter the socket, after which by a few turns of the spindle or connecting member it will serve to draw the head snugly in engagement with the shank. For the purpose of further tightening the parts there is mounted on the threaded sleeve 26 the nut 23 having an operating handle or lever 40, one of the faces of said nut being normally permitted to slightly overhang the rearward end of the sleeve 26, so that when the fastening member or spindle 22 is tightened, the shoulder 28 will abut on the face of the nut, rather than on the rearward end of the sleeve 26. A slight turn of the nut by means of the handle 40 will result in a rearward pull on the spindle or connecting member 22, whereby the head will be moved in contacting engagement with the shank of the tool holder much more forcibly than could be done by mere manipulation of the spindle or fastening member, thereby assembling the parts with the utmost rigidity, the importance of which is well understood.

The obliquely disposed face of the shank 20 is preferably filed, ground or otherwise treated to produce concave portions 41 and intermediate flat face portions or contact points 42, three in number, thereby producing a triple contact between the engaging or meeting faces of the shank and the head which will result in the head being seated with the utmost accuracy when the parts are assembled. The side face of the head where it engages the overhanging shoulder 27 is also formed with a concavity 43 producing contact points 44 at the upper and lower ends only, thereby avoiding the possibility of any irregularity of adjustment which might be caused by a grain of metal or other obstruction adhering to the opposed faces of the shoulder 27 and the head.

It will be understood that when the parts are assembled the operator will manually guide the head in engagement with the shank of the tool holder until the head becomes practically seated, after which the head is tightened with respect to the shank by means of the threaded connecting member. In thus tightening the head it is obvious, however, that a sliding movement of minute extent occurs between the head and the shank, such movement being partly vertical and partly lateral. The connecting member or spindle 22 should, therefore, not be snugly fitted in the bore of the shank, but sufficient play should be permitted to enable such movement, however slight, to take place.

From the foregoing description, taken in connection with the drawings hereto annexed, the operation and advantages of this invention will be readily understood. The facility with which the tool carrying head may be removed and replaced is evident, and it is also evident that such removal and replacement may be effected without changing the set of the tool.

Having thus described the invention, what is claimed as new, is:—

1. In a lathe tool holder, a shank, a detachable tool carrying head, a primary assembling member extending longitudinally of the shank and detachably connected with the head, said member having means coöperating with the head to limit longitudinal movement thereof with respect to the shank, and secondary means for tightening the primary assembling member to preclude lengthwise movement thereof.

2. In a lathe tool holder, a shank, a detachable tool carrying head, a primary assembling member extending longitudinally of the shank and in threaded engagement with the head, said assembling member having a shoulder coöperating with the head to limit longitudinal movement thereof with respect to the shank, and secondary means for tightly engaging the primary assembling member to preclude lengthwise movement thereof.

3. In a lathe tool holder, a shank, a detachable tool carrying head, a primary assembling member extending longitudinally through the shank and in threaded engagement with the head, said assembling member having a shoulder coöperating with the head to limit longitudinal movement thereof with respect to the shank, and secondary means engaging the shoulder to forcibly move the primary assembling member lengthwise of the shank, thereby tightly seating the head upon the shank.

4. A lathe tool holder comprising a shank and a tool carrying head having obliquely disposed meeting faces, each on a single plane with respect to the axis of the shank, said faces being capable of limited vertical and lateral sliding movement with respect to each other, and an assembling member extending through the shank and in threaded engagement with the head for securing the same on the shank.

5. A lathe tool holder comprising a shank and a detachable tool carrying head, said shank and head having obliquely disposed meeting faces, and stops to limit lateral and vertical movement of the head with respect to the shank, and an assembling member extending lengthwise of the shank in threaded engagement with the head.

6. A lathe tool holder comprising a shank, and a detachable tool carrying head, said shank and head having obliquely disposed meeting faces, and limiting stops; and assembling means whereby tension will be exerted on the head relatively to the shank to bring the meeting faces of the head and the shank forcibly in contact with each other.

7. A lathe tool holder comprising a shank, a detachable tool carrying head, said shank and head having obliquely disposed meeting faces, and assembling means, one of the meeting faces being formed to produce a triple contact between itself and the opposed meeting face.

8. A lathe tool holder comprising a shank and a detachable tool carrying head, said shank and head having obliquely disposed meeting faces and relatively overhanging stop shoulders, and assembling means, one shoulder having a concave face producing a double contact between itself and the part engaged thereby.

9. A lathe tool holder comprising a shank and a detachable tool carrying head, said shank and head having obliquely disposed meeting faces and each having an overhanging shoulder forming a limiting stop, one face being formed to produce a triple contact between itself and the opposed meeting face and one shoulder being formed to produce a double contact between itself and the part contacting therewith; and means for assembling the head with the shank.

10. A lathe tool holder comprising a shank having a longitudinal bore and provided at one end with an externally threaded sleeve, a detachable tool carrying head, said shank and head having obliquely disposed meeting faces, and means to limit lateral and vertical movement of the head relatively to the shank, and said head having a threaded socket substantially alining with the bore of the shank, an assembling member consisting of a spindle extending through the bore of the shank and having a threaded portion to engage the socket of the head, said spindle having a limiting shoulder and a nut on the threaded sleeve facing the limiting shoulder of the assembling member.

11. A lathe tool holder comprising a shank, a detachable tool carrying head, said shank and head having opposed meeting faces, a primary assembling member extending longitudinally through the shank and in threaded engagement with the head, said assembling member having means coöperating with the head to limit longitudinal movement thereof, and secondary means for actuating the assembling member to pull the head forcibly in engagement with the shank.

In testimony whereof I affix my signature.

RUDOLPH MILECZ.

Copies of this patent may be obtained for five cents each, by addressing the "Commissioner of Patents, Washington, D. C."